UNITED STATES PATENT OFFICE.

SPENCER B. NEWBERRY AND HARVEY N. BARRETT, OF BAYBRIDGE, OHIO.

PROCESS OF PRODUCING FERTILIZER.

1,158,711. Specification of Letters Patent. Patented Nov. 2, 1915.

No Drawing. Original application filed December 17, 1910, Serial No. 598,127. Divided and this application filed March 15, 1912. Serial No. 684,014.

*To all whom it may concern:*

Be it known that we, SPENCER B. NEWBERRY and HARVEY N. BARRETT, citizens of the United States, residing at Baybridge, in the county of Erie and State of Ohio, have invented a certain new and useful Improvement in Processes of Producing Fertilizer, of which the following is a specification, and is based upon the subject-matter contained in and divided out of our co-pending application, Serial No. 598,127, filed December 17, 1910, for process of producing fertilizer from natural phosphate.

Our invention relates to the conversion of natural phosphates into citrate-soluble form, thus rendering them available and effective for the nourishment of plants. This we accomplish by exposure of the natural phosphates to high temperature, with the addition of certain reagents in very small proportion, under certain special conditions as hereinafter described. We have discovered that natural phosphate may be rendered citrate soluble or suitable for fertilizing purposes by calcination, and that such process of calcination is commonly shortened by the association therewith of certain reagents. We have experimented with many conditions and substances all of which it is of course unnecessary to here set forth in detail, but we shall describe some of the conditions of our operation and some of our subordinate discoveries as a basis for the broad claims which we desire to make. By natural phosphates we mean phosphate rock consisting essentially of phosphate of calcium or phosphate of aluminum and phosphate of iron, also apatite, phosphorite, guano, bone phosphate or other forms of mineral or animal phosphate which contain phosphoric acid in a form substantially insoluble in ammonium citrate solution and unavailable, in an untreated condition, for use as a fertilizer.

We are aware that during the past fifty years a great number of proposals have been made for making fertilizer from natural phosphates by heating them with relatively large amounts of various substances. Among the substances proposed may be mentioned carbon, lime, alkalis, silicates of alkalis and of alkaline earths, etc. Many of these processes were intended to be applied only to materials similar to Redonda phosphate, consisting of phosphate of aluminum and iron, and are entirely ineffective when applied to ordinary phosphate rock, consisting chiefly of phosphate of calcium. None of these proposals specified the manner of heating or describes the kind of kiln or furnace to be employed. It is certain that none of the processes hitherto described has ever come into practical use, and that a product consisting of phosphate of calcium rendered by calcination even approximately citrate-soluble, has not, as yet, appeared in the market.

Our experiments and study of the problem have led to the following discoveries:—

1. Natural phosphates may be rendered substantially completely citrate soluble by calcination alone, under certain conditions of temperature, atmosphere, and exposure to heat, without the addition of reagents.

2. Reagents, if added, act only in an auxiliary manner, the principal effect of the operation being due to the action of heat and of the gaseous atmosphere of the kiln.

3. Certain reagents, added to the natural phosphate in very small proportion, for example to the amount of five to fifteen per cent. of the weight of phosphate, have the effect of shortening the time and lowering the temperature necessary to render the phosphate citrate-soluble. Substances which we have found efficient for this purpose are alkalis in free or caustic form or in any combinations as alkaline salts or compounds, preferably in the form of alkali-metal hydroxid, carbonate of sulfate.

These substances, when highly heated in an oxidizing atmosphere in contact with natural phosphates, are volatilized and expelled in gaseous form. The act, therefore, as it would appear, only in a mechanical manner or by their presence, in aiding the transformation of the phosphate into soluble form, since the chemical composition of the phosphate, before and after the calcination, is substantially the same. The chief agents in changing the phosphate to a soluble state are the high temperature and exposure to highly heated products of combustion, and the various substances above mentioned are to be regarded as merely auxiliary and unessential except for the subordinate results thereby obtained, such as the shortening of the time required for the operation.

The conditions which are essential or at least highly important to the practically complete transformation of natural phosphate to citrate-soluble form are:—High temperature; sufficiently prolonged heating; a moderately oxidizing or at least non-reducting atmosphere; continual exposure of fresh surfaces of the material to contact with the highly heated products of combustion.

Conditions which are or may be auxiliary and helpful in bringing about the transformation at lower temperature and in shorter time are: fine sub-division of the raw material; presence of a small proportion of certain reagents, especially such as at high temperature evolve sulfur dioxid, carbon dioxid, or other gaseous products.

The conditions of calcination above stated may be secured to great advantage and with great economy by the use of internally-fired revolving kilns. The application of the conditions of temperature, regulation of degree of oxidation of the atmosphere, and continual exposure of fresh surfaces of material, as obtained by the use of the revolving kiln, to the conversion of phosphates into soluble form is, we believe, a new conception, and being essential to success and production of a result not heretofore attained, is claimed as our invention.

As a practical example of our process, we take ordinary phosphate rock or other natural phosphate and pulverize it with the addition of from five to fifteen per cent. of its weight of one of the reagents above named, or of a mixture of two or more such reagents. The pulverizing may be effected by wet or dry process. The ground material is then introduced gradually into the upper or feed end of a revolving cylindrical kiln, lined with refractory material, preferably of a basic character, and internally heated by a flame or flames of coal-dust, oil or gas. The kiln is slightly inclined toward the fire end, and revolves at a rate of one revolution in one to two minutes. The fuel is fed into the kiln in intimate mixture with air, and additional air is admitted in such amount that the fuel shall be completely consumed in the lower part of the kiln, and that a moderately oxidizing atmosphere shall prevail throughout the interior space, care being taken to avoid admitting any considerable excess of air above that required for perfect combustion. The temperature in the hottest zone, at about one-fourth the length of the kiln from the fire end, is maintained at 2500 degrees to 3000 degrees F., according to the more or less refractory character of the material treated. The temperature should be regulated so as to bring the material to a sintered or semi-fused and porous condition, and to yield a product of maximum and practically complete citrate-solubility. This result may generally be obtained at a temperature between the limits above stated.

The operation of the kiln is such that the raw material, entering at the upper end, travels slowly and continuously toward the source of heat, and by the rotary motion to which it is subjected, is agitated and turned over in such manner as constantly to expose fresh surfaces to the action of the highly heated products of combustion. Before reaching the hottest zone, easily volatile products, such as water and carbon dioxid, are expelled, and at the highest temperature of the kiln, sulfur dioxid and alkalis, if present, are wholly or in larger part volatilized.

The calcined product issues from the kiln in the form of soft, porous clinker. This is ground to powder and is then ready for use as fertilizer or as an ingredient of commercial fertilizers.

The time of heating required varies with the character of the raw material, presence and proportion of reagents, and temperature employed. We have found, however, that raw material containing about ten per cent. of reagent such as soda or sodium sulfate is brought to practically complete solubility by exposure of thirty minutes to one hour to a temperature of 2500 degrees to 3000 degrees F.

We have found it advantageous, for the sake of economy, to make use of well-known appliances, in connection with the revolving kiln, for the collection of volatilized alkalis and sulfur dioxid, and for heating the entering air by contact with the hot clinker discharged from the kiln.

We wish it to be understood that the conditions highly important if not necessary for effective conversion of natural phosphate of citrate-soluble form, by our process, are prolonged exposure to highly heated gases, with such mechanical agitation as will constantly present fresh surfaces of material to contact with the highly heated gaseous atmosphere. These conditions are most perfectly produced in a revolving kiln, but we do not intend to restrict our claims to the use of that apparatus, since any type of kiln or furnace which the conditions above named are developed would produce a similar result.

We claim:

1. The process of rendering insoluble calcium phosphate citrate-soluble without changing its chemical characteristics, which consists in calcining powdered insoluble calcium phosphate in the presence of such an amount of an alkali-metal salt and at such temperature that the calcium phosphate will be rendered citrate-soluble and the alkali-metal salt will be decomposed and substantially expelled without permanent reaction with the calcium phosphate.

2. The process of making fertilizer by calcining natural phosphate with a small percentage of an accelerating material volatile at the temperature of calcination and consisting of an alkali-metal salt.

3. The process of making fertilizer by calcining natural phosphate with from 5 to 15 per cent. of an accelerating material volatile at the temperature of calcination and consisting of an alkali-metal salt.

4. The process of making fertilizer by calcining natural phosphate with a small percentage of accelerating material volatile at the temperature of calcination and consisting of alkali-metal salt at a temperature of from 2500 to 3000 degrees Fahrenheit.

5. The process of making fertilizer by calcining natural phosphate with from 5 to 15 per cent. of an accelerating material volatile at the temperature of calcination and consisting of an alkali-metal salt at a temperature of from 2500 to 3000 degrees Fahrenheit.

6. The process of making fertilizer by calcining natural phosphate with from 5 to 15 per cent. of an accelerator consisting of an alkali-metal salt at a temperature of from 2500 to 3000 degrees Fahrenheit, and agitating the materials and mixing them together at this temperature until the volatile constituents of the accelerating material are substantially expelled and the residue is rendered substantially citrate-soluble.

7. The process of making fertilizer by calcining natural phosphate with a small percentage of substance principally volatile at the temperature of calcination.

8. The process of making fertilizer by calcining natural phosphate with alkali-metal compound principally volatile at the temperature of calcination.

9. The process of making fertilizer by calcining natural phosphate with 5 to 15 per cent. of alkali-metal compound principally volatile at the temperature of calcination.

10. The process of making fertilizer by calcining natural phosphate with alkali-metal compound principally volatile at high temperature until the alkali-metal compound is substantially expelled and the phosphate rendered citrate-soluble.

11. The process of making fertilizer by calcining natural phosphate with 5 to 15 per cent. of alkali-metal compound principally volatile at high temperature, at 2500 degrees to 3000 degrees F., until the alkali-metal compound is substantially expelled and the residue rendered substantially citrate soluble.

12. The process of making fertilizer by calcining a mixture of natural phosphate with alkali-metal compound principally volatile at high temperature, at a heat sufficient to substantially expel the alkali-metal compound in such manner that the material shall travel continuously toward the source of heat and shall be so agitated as to present fresh surfaces to the contact of highly heated gaseous products of combustion.

13. The process of making fertilizer by pulverizing natural phosphate, mixing therewith 5 to 15 per cent. of alkali-metal compound principally volatile at high temperature, and calcining the mixture at 2500 degrees to 3000 degrees F., until the alkali-metal compound is substantially expelled and the residue rendered substantially citrate soluble and brought to approximately the same composition as the phosphate treated except for loss of volatile matter.

14. The process of rendering insoluble calcium phosphate citrate soluble without material change in its chemical composition, which consists in calcining powdered insoluble calcium phosphate in the presence of such an amount of alkali-metal compound and at such temperature that the calcium phosphate will be rendered citrate soluble and the alkali-metal compound will be decomposed and substantially expelled.

15. The process of making fertilizer by pulverizing natural phosphate, mixing therewith 5 to 15 per cent. of alkali-metal compound principally volatile at high temperature, calcining the mixture at a temperature of 2500 degrees to 3000 degrees F., in such manner that the material shall travel continuously toward the source of heat and shall be so agitated as to present fresh surfaces to contact with highly-heated products of combustion, until the alkali-metal compound is substantially expelled and the residue rendered substantially citrate - soluble, and pulverizing the calcined product.

Signed at Baybridge Ohio this twelfth day of March 1912.

SPENCER B. NEWBERRY.
HARVEY N. BARRETT.

Witnesses:
HATTIE M. MEGGITT,
IRVIN H. NUBER.